No. 880,048. PATENTED FEB. 25, 1908.
R. R. STEIN.
SOLDERING COPPER.
APPLICATION FILED JUNE 10, 1907.
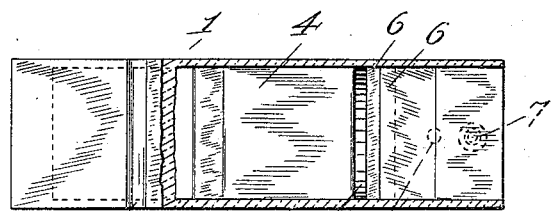
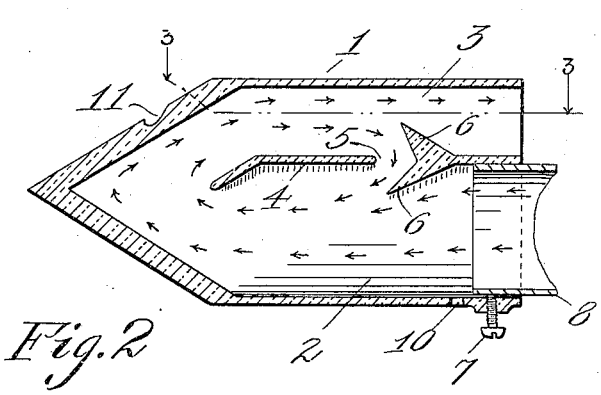
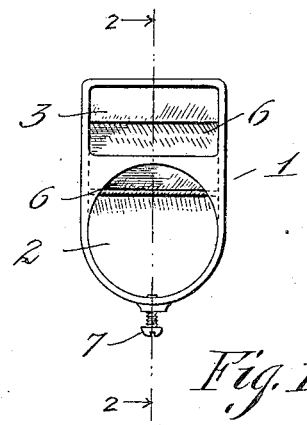
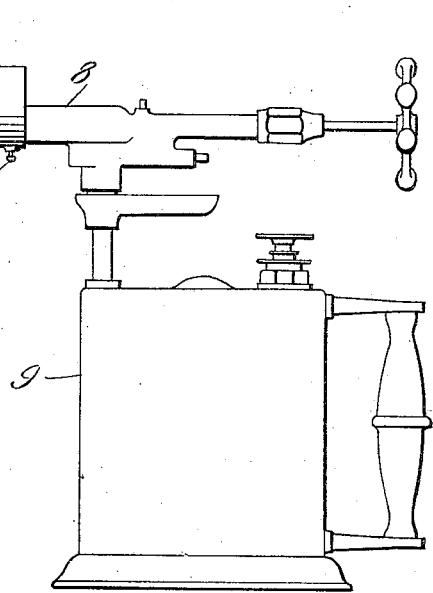
Witnesses
Arlita Adams
Edward W. Cressman.
Inventor
Robert R Stein
By Adams & Brooks
Attorneys

UNITED STATES PATENT OFFICE.

ROBERT R. STEIN, OF SEATTLE, WASHINGTON.

SOLDERING-COPPER.

No. 880,048.  Specification of Letters Patent.  Patented Feb. 25, 1908.

Application filed June 10, 1907. Serial No. 378,279.

*To all whom it may concern:*

Be it known that I, ROBERT R. STEIN, a citizen of the United States of America, and a resident of the city of Seattle, in the county of King and State of Washington, have invented certain new and useful Improvements in Soldering-Coppers, of which the following is a specification.

My invention has for its primary object the provision of an improvement of the above type which can be heated in an efficient manner with a saving of fuel.

A further object resides in the provision of a novel construction, by which unconsumed gases will be prevented from escaping from the copper and caused to travel back into intake conduit where they are consumed by the entering flame.

With the above and other objects in view, to be referred to as the description progresses, the invention resides in the construction, arrangement and combination of parts hereinafter described and succinctly defined in the claims hereto annexed.

Referring now to the accompanying drawing, in which like numerals of reference indicate like parts throughout the several views: Figure 1 is a rear end elevation of the present invention. Fig. 2 is a longitudinal sectional view thereof taken on line 2—2 of Fig. 1. Fig. 3 is a sectional view taken on line 3—3 of Fig. 2, and Fig. 4 is a view in side elevation of my improved soldering copper secured to a blow torch, as in operation.

The soldering copper 1 is formed with inwardly extending intake and return conduits, 2 and 3 respectively, separated by a wall or partition 4 whose inner or forward end portion is spaced from the adjacent wall of the copper, thereby providing a passage in communication with conduits 2 and 3.

It will be noted that wall or partition 4 is arranged a little above the longitudinal center of the soldering copper so as to provide a comparatively large intake conduit and in order to cause the flame to travel forwardly well into the point or nose of the device, said wall or partition has its forward end portion inclined downwardly in a forward direction, as clearly shown in Fig. 2.

Reference numeral 5 indicates another passage communicating with conduits 2 and 3, the same being formed in wall or partition 4, adjacent its outer end portion, and from the rear edge of said passage, deflectors 6 project outwardly in a forward direction into said conduits. Deflectors 6 have their front and rear faces inclined forwardly.

Reference numeral 7 indicates a screw, by which the device is secured on the burner 8 of the blow torch 9, and 10 indicates a vent in the wall of the intake conduit for admitting air to promote combustion.

The shape of the soldering copper is not of great importance to the invention, I preferably provide the same however, with a transverse groove 11 in which the ends of copper wires to be soldered, can be placed, as is obvious.

In operation, assuming that the blow torch is in operation and the soldering copper is fastened thereto, as shown, the flames travel through conduit 2, then around the forward end portion of partition 4, and contacting with the interior of the point or nose of the soldering copper, heat the same thoroughly. After passing around the forward end portion of partition 4, the velocity of the flame is practically spent and the flame almost extinguished. The unconsumed gases emitted from the blow torch, will then lower or fall below the lighter burned gases and striking the upper deflector 6 will be deflected through passages 5 so that they will be drawn or sucked into the intake conduit and consumed by the flame, as is apparent.

While I have herein shown and described a preferred embodiment of my invention, I reserve the right to make such changes and alterations in the minor details of construction, as fall within the scope of the appended claims.

Having thus fully described my invention, what I claim as new and desire to secure Letters Patent on from the United States, is:

1. A hollow soldering copper provided with a partition and formed on opposite sides of said partition with inwardly extending conduits in communication with one another at their inner end portions, said wall or partition separating said conduits being formed with an opening forming a passage between said conduits, for the purpose specified.

2. A soldering copper formed with inwardly extending conduits and spaced passages communicating therewith, and deflector means adjacent the outer of said passages, for the purpose specified.

3. A soldering copper formed with inwardly extending intake and return conduits and spaced passages communicating therewith, and deflector means arranged in said return conduit and adjacent the outer of said passages, for the purpose specified.

4. A soldering copper formed with inwardly extending intake and return conduits and spaced passages communicating therewith, and deflectors projecting from the outer of said passages into said conduits, for the purpose specified.

5. A soldering copper formed with inwardly extending intake and return conduits and spaced passages communicating therewith, and forwardly projecting deflectors in said conduits fixed to the wall or partition separating said conduits to the rear of the outer of said passages.

Signed at Seattle, Washington this 21 day of May 1907.

ROBERT R. STEIN.

Witnesses:
STEPHEN A. BROOKS,
ARLITA ADAMS.